United States Patent [19]

Das et al.

[11] 4,308,114

[45] Dec. 29, 1981

[54] ELECTROLYTIC PRODUCTION OF ALUMINUM USING A COMPOSITE CATHODE

[75] Inventors: Subodh K. Das, Apollo; Perry A. Foster, Jr., New Kensington; Gregory J. Hildeman, Murrysville, all of Pa.

[73] Assignee: Aluminum Company of America, Pittsburgh, Pa.

[21] Appl. No.: 170,639

[22] Filed: Jul. 21, 1980

[51] Int. Cl.³ ............................. C25C 3/06; C25C 7/02
[52] U.S. Cl. ............................................ 204/67; 204/294
[58] Field of Search ................................ 204/67, 294

[56] References Cited

U.S. PATENT DOCUMENTS

| | | | |
|---|---|---|---|
| 2,997,744 | 8/1961 | Stoddard et al. | 204/294 |
| 3,156,639 | 11/1964 | Kibby | 204/243 R |
| 3,400,061 | 9/1968 | Lewis et al. | 204/67 |
| 3,471,380 | 10/1969 | Boullough | 204/294 |
| 3,661,736 | 5/1972 | Holliday | 204/67 |
| 3,856,650 | 12/1974 | Kugler et al. | 204/243 R |
| 4,071,420 | 1/1978 | Foster, Jr. et al. | 204/67 |
| 4,121,983 | 10/1978 | Kinosz et al. | 204/67 |

*Primary Examiner*—Howard S. Williams
*Attorney, Agent, or Firm*—Carl R. Lippert

[57] ABSTRACT

A metal such as aluminum is produced by electrolysis of a compound of the metal in a solvent or bath such as molten salt. Electrolysis is carried out by passing a current from an anode to a cathode between which the solvent bath is situated. The cathode is composed of a composite comprising graphite and a refractory hard metal such as titanium diboride. The properties and performance of the composite cathode are improved through careful manufacturing controls and selectivity with respect to electrode configuration and cell operating conditions.

38 Claims, 5 Drawing Figures

ELECTROLYTIC PRODUCTION OF ALUMINUM USING A COMPOSITE CATHODE

BACKGROUND OF THE INVENTION

The invention relates to the production of a metal, such as aluminum, by electrolysis of a compound of the metal and in particular to the production of aluminum by electrolysis of a compound thereof, such as chloroaluminate or fluoroaluminate. More particularly, the invention relates to graphite containing composite cathode electrodes or electrode members containing a refractory hard metal, such as $TiB_2$ used in such electrolytic cells, and to the manufacture of such electrode members and to selective use thereof in electrolytic cells.

Generally speaking, aluminum is produced by electrolysis of aluminum compounds, such as aluminum oxides or salts or other compounds, in a molten salt bath. Such usually concerns situating the molten salt electrolyte between an anode and cathode and passing current through the gap between the anode and cathode. One of the more prominent of such baths is the fluoroaluminate bath ($AlF_3$—$NaF$—$CaF_2$) used in the well-known Hall cell. Another type of bath is the chloroaluminate type ($AlCl_3$—$NaCl$—$LiCl$—$KCl$—$MgCl_2$) used in other cells such as is described in U.S. Pat. No. 3,755,099. In electrolytic cells for the production of aluminum, it is common for the anode to be vertically spaced from the cathode such that the current passes in a generally vertical direction through the bath. The anode can be a baked carbon block and the cathode, as seen by the salt bath, is liquid aluminum. Current passes from the anode through the salt bath to the liquid aluminum cathode and thence to the supporting media beneath the liquid aluminum (typically the bottom of the cell). The cells may be monopolar, such as depicted in U.S. Pat. Nos. 3,400,061 and 4,071,420, or they can be bipolar, such as depicted in U.S. Pat. No. 3,755,099, all of which are incorporated herein by reference.

One problem in the operation of such electrolytic cells in producing aluminum is the desire to increase the power efficiency in operating the cell. This could be accomplished by decreasing the distance between the anode and the cathode, thus lessening the electrical resistance within the cell. However, such disturbs the liquid aluminum cathode and causes it to vary in thickness, thus limiting the anode-cathode spacing to that which safely accommodates the highest waves in the liquid aluminum cathode without short-circuiting.

It is recognized in the art that the use of refractory hard metal, such as titanium diboride, as a cathode surface in such cells offers significant advantages since the $TiB_2$ surface is readily wettable by liquid aluminum. This then permits the cathode surface to be drained of liquid aluminum and eliminates the problems caused by electromagnetic disturbance of a deeper or thicker aluminum pool and enables achieving reduced anode-cathode distances and improved power efficiencies. However, achieving a dependable titanium diboride cathode surface has often been difficult and quite expensive. Not only is titanium diboride very expensive, but it suffers from sensitivity to thermal stress encountered in heating a cell to start production. Composites of carbon and $TiB_2$ including $TiB_2$-coated carbon have been tried but results to date have not been entirely satisfactory.

SUMMARY OF THE INVENTION

In accordance with the invention, an improved cathode surface region is provided as a composite of graphite and a refractory hard metal such as titanium diboride. It is important that the carbonaceous phase or component be graphite rather than ordinary carbon because of the superior thermal and electrical conductivity and resistance to thermal shock of graphite. For instance, the higher electrical resistance of ordinary carbon tends to offset to a degree the hoped-for decrease in electrical resistance across an electrolytic cell. Further, it is important that the carbonaceous phase or component be constituted of a substantially continuous unitary graphitic structure particularly where the surface region extends out of a molten aluminum pool or pad and is continuously subjected to a flow of molten aluminum thereover, especially an aggressive flow. The refractory hard metal can be combined with the graphite substantially throughout the thickness of the graphite or it can be concentrated in the surface areas. The respective graphite and refractory hard metal components can be combined at various stages of manufacture. In one approach or embodiment, they are combined as powders or in particulate form prior to compacting. In another approach or embodiment, the refractory hard metal is combined with the carbonaceous phase by including the refractory hard metal as a suspension in the pitch used as a binder in forming the initial carbonaceous compact. Another embodiment omits the carbonaceous particles and constitutes the initial compact from pitch or carbonaceous binder and the refractory hard metal. Still another approach or embodiment includes suspending the refractory hard metal in the pitch used to densify the carbonaceous compact after it is first compacted and baked. Another approach or embodiment includes suspending the refractory hard metal in a suitable vehicle and incorporating such into the pores of the graphite after graphitization. Two or more of these approaches or embodiments can be combined in practicing the invention.

Accordingly, it is an object of the present invention to provide an improved cathode electrode in electrolytic cells for producing aluminum or other metals comprising an improved composite of graphite and a refractory hard metal especially useful where the cathode projects outwardly from a base cathode and into a molten metal pool or still further projects through the molten metal pool into the electrolyte toward the anode.

Another object is to provide for controlling the manufacture and structure of the graphitic portion of a graphite-refractory hard metal composite to assure compatibility between the two phases thereof through extended periods of operation in an electrolytic cell for producing aluminum.

These and other objects will be apparent from the drawings, specification and claims appended hereto.

DETAILED DESCRIPTION OF THE INVENTION

Figure 1:
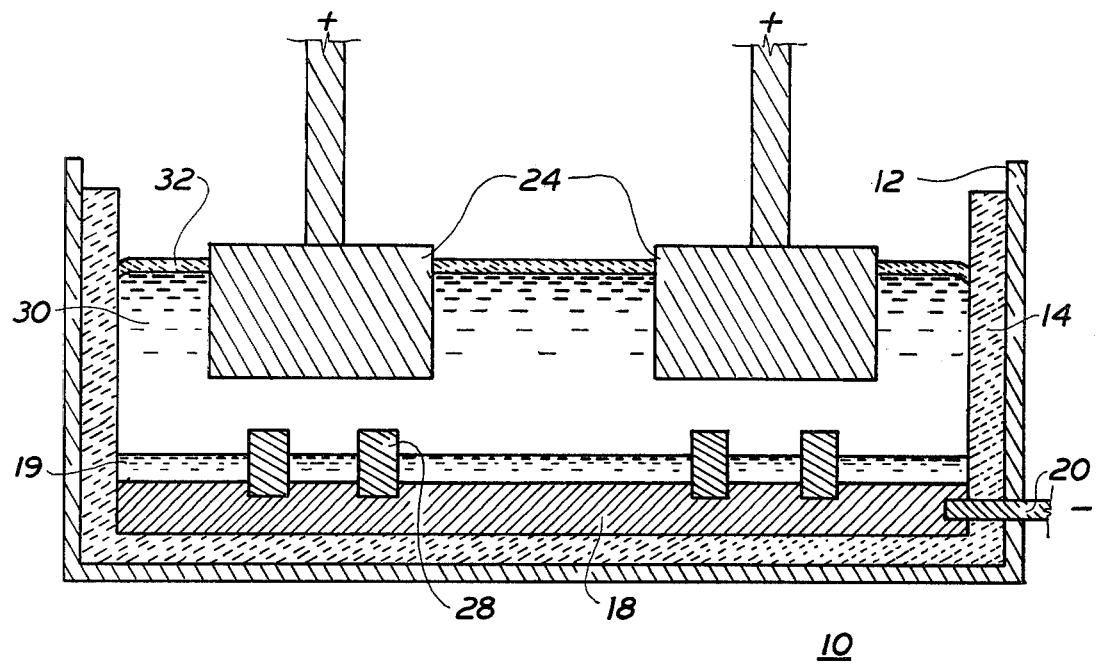
FIG. 1 is a schematic sectional elevation of an electrolytic cell useful for producing aluminum.
Figure 2:
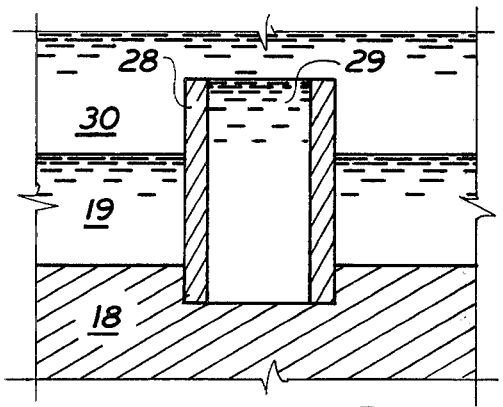
FIGS. 2, 3, 4 and 5 are schematic partial elevation views in cross section illustrating embodiments of projecting electrode members in accordance with the invention.
Figure 3:
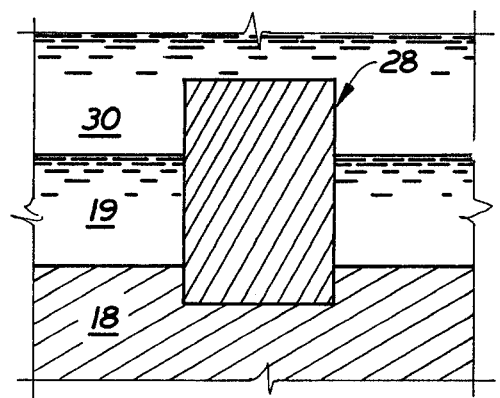

A suitable cell for producing aluminum in accordance with the invention is illustrated schematically in FIG. 1. The cell comprises an outer steel shell 12 lined with a refractory or insulative material 14. Within the lower region of the shell is situated a cathode bottom or base member 18 which is connected electrically to a cathode collector bar system 20. The cathode base 18 is typically constructed of graphite or other electrically conductive material. Above the cathode is situated one or more anodes 24 which are connected to a provision for voltage drop between the anode and cathode. The cell contains an electrolyte 30 and usually has a surface crust 32 which serves to contain heat and prevent atmospheric attack. Upon the cathode 18 rests a pool 19 of molten aluminum. In the normal operation of a conventional Hall cell, this pool functions as the cathode electrode as seen by the electrolyte bath 30. However, in one preferred embodiment of the invention, composite refractory hard metal-graphite upstanding bodies 28 protrude out of the cathode base 18 and above the level of the molten aluminum pool 19 and into the overlying electrolyte salt bath 30 toward the anode 24 as depicted in FIG. 1. This sets the anode-to-cathode distance as the vertical distance between the upper surface of cathode insert or protrusion 28 and the bottom surface of anode 24. This distance can be as little as ¾ inch or ½ inch or even less, for instance ¼ inch and less is feasible. The distance by which the upstanding cathode members 28 project above the molten aluminum pool 19 should be at least ½ inch or ¾ inch minimum and preferably at least 1 inch, for instance 2 inches. While two such bodies 28 are shown in FIG. 1 for each anode 24, a greater plurality may be used. A preferred practice of the invention features providing the cathode members 28 as upstanding hollow cylinders or pipes, such as depicted in U.S. Pat. No. 4,071,420, incorporated herein by reference. The provision of such hollow pipe-like cathode bodies 28 enables each pipe-like body to hold some molten aluminum and the pipe and the molten aluminum pool within the pipe combine to serve as a cathode. This is illustrated in FIG. 2 which shows such a cathode member 28 embedded in the cathode bottom 18 and containing a small pool of molten aluminum 29 extending above the main aluminum pool 19 contacting the base cathode 18. In operation, molten aluminum is deposited from the bath upon the surface of cathode extension 28 and of the molten metal pool 29 contained therewithin and flows over into the main aluminum pool 19. An alternative embodiment is shown in FIG. 3 which shows a solid cathode member 28 embedded in the cathode bottom 18.

Figure 4:
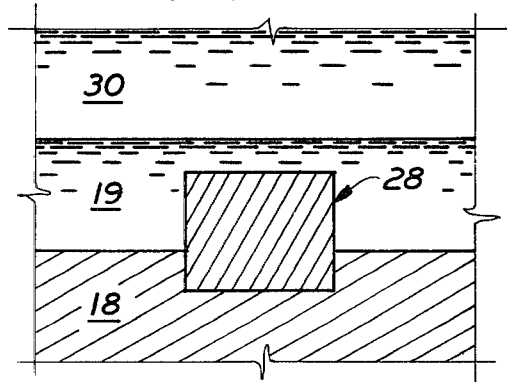

Another practice of the invention is depicted in FIG. 4 which shows cathode protrusion 28 as extending into the molten aluminum pool 19 but not into the overlying electrolyte 30. This embodiment enables shortening the effective anode-cathode distance by bringing the anode 24 closer to the molten metal pool 19 with less risk of short-circuiting than would be the case without any protrusion 28. This is because of a calming effect of the protrusions 28 upon electromagnetic disturbances and bath movement and waves. The use of essentially pure graphite protrusions alone would confer a significant benefit in this arrangement, but the use of the improved composite for the protrusions 28 still further reduces the electrical resistance of the cell and thus provides for improved power efficiency. Hence, the protruding electrode members 28 project into the molten metal pool 19 and can either terminate in that pool, as shown in FIG. 4, or can extend through that pool and beyond into the electrolyte bath 19, as shown in FIGS. 1, 2 and 3.

Figure 5:
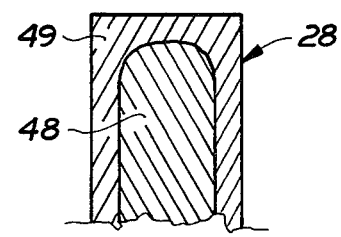

Another embodiment shown in FIG. 5 includes in the cathode member 28 an essentially pure graphite core portion 48 and a graphite-refractory hard metal composite outer layer 49. That is, the important part of the cathode for purposes of the present invention is the surface region which denotes the region contacting the molten aluminum, or the regions contacting the aluminum and the electrolyte where applicable, or the regions immediately beneath an essentially pure refractory hard metal thin surface coating.

The particular arrangement of protruding cathode member extensions or protrusions 28 depicted in FIGS. 1 through 4 is preferred in practicing the invention as simplifying retrofitting of the invention into existing and older Hall-type cells. In these arrangements the protruding cathode members 28 can be set into the graphite cathode bottom 18 sealed or in sufficient contact therewith for conducting electric current from the protruding cathode member 28 through the cathode bottom 18 and to the cathode collector bar system 20. However, the invention is not necessarily intended to be limited to such and can even be applied to a much larger or monolithic cathode member, such as that depicted in U.S. Pat. No. 3,400,061. Such a cathode could be arranged for continuous draining to remove the molten aluminum deposited thereon and provide a continuously replenished aluminum film thereon.

Referring again to FIG. 1, the electrolyte 30 may be a fluoroaluminate type containing aluminum fluoride, sodium fluoride and calcium fluoride of the type conventionally used in Hall cells for electrolytically reducing alumina ($Al_2O_3$) to produce aluminum. Also, the electrolyte 30 may be of the chloroaluminate type containing aluminum chloride, sodium chloride, lithium chloride, potassium chloride and magnesium chloride for producing aluminum electrolytically from $AlCl_3$. Also, the cell may be monopolar, as shown in FIG. 1, or it may be of the bipolar type, such as that depicted in U.S. Pat. No. 3,755,099.

The term "refractory hard metal" as used herein refers to the carbides, borides, silicides and nitrides of the transition metals in the fourth to sixth groups of a periodic table which are wettable by molten aluminum under electrolytic cell operating conditions and relatively insoluble in molten aluminum and in the molten electrolyte and having at least moderate electrical conductivity and dimensional stability. The preferred refractory hard metals are the borides of titanium and zirconium such as $TiB_2$. In practicing the invention the refractory hard metal is used in particulate form preferably having a particle size within the range which passes through a 200 mesh screen, and preferably which passes through a 325 mesh screen (Tyler Series). This particulate form is available commercially or can be produced by grinding larger particles or pieces.

According to some embodiments of the invention, the improved cathode-electrode member, specifically referring to the inserts 28 in FIGS. 2, 3 and 4, can be manufactured according to steps which generally correspond to those normally employed in manufacturing graphite. The carbonaceous starting material for the graphite may be graphite grade carbon derived from coke produced from coal or petroleum or it can be particulate graphite material. In the case of petroleum coke, such may be calcined at a temperature of about 800° C. to 1600° C. in order to drive off volatile impurities before proceeding with the further steps in producing the graphite, although this calcining step can be omitted where desired. Basic steps in manufacturing graphite include providing a green compact by blending the carbon with a pitch binder with or without working to reduce the cross-sectional dimensions of the compact. At this point the shaped green body can be cut into sections to provide two or more electrode members. This is followed by baking to drive off the volatiles. Bodies are then immersed to impregnate them with liquid pitch which tends to increase the density of the final graphitized product. Impregnation is followed by baking and the impregnation-baking cycle can be repeated a number of times to further densify the compact. After this, the body is finally graphitized by heating to a rather high temperature under proper conditions to convert the carbon structure into the graphite structure.

It may be useful to clarify differences and distinctions between baking and graphitizing as they apply to heating carbonaceous bodies and making graphite. Baking is normally done by heating a carbonaceous body, either in unitary or particulate form, for the purpose of driving off volatiles, such as components in the pitch used in binding or densifying a carbonaceous body. In the baking process, temperature is gradually increased to allow for the evolution of the volatiles and to permit the shrinkage which occurs in the baking operation to proceed gradually so as to avoid cracking. Baking temperatures normally range from about 700° to about 1000° C., although higher temperatures also can be employed, and the operation can be referred to as baking or sometimes as calcining. Calcining for the most part applies to particulates or raw material, whereas the baking term usually applies to a green compact comprising particulate carbonaceous material and a pitch-type binder wherein baking converts the pitch binder into coke to provide solid bonds with the filler materials. The baking operation is normally carried out in a conventional convection-type furnace heated by gas or oil with the heat input to the carbon being by indirect heat transfer. The entire heating cycle in baking is somewhat time consuming, and can take from a week or two up to a month or more. Baking typically results in substantial shrinkage through loss of volatiles. However, there is no significant change in the carbonaceous internal structure achieved in baking, and the structure continues to appear as amorphous or as containing crystallites of such small size as to make the structure appear or at least behave like an amorphous structure.

Graphitization is readily distinguished from baking in that it is done at somewhat higher temperatures and produces drastic and easily observed changes in the internal structure but without drastic changes in density, as contrasted with baking as just described. In graphitizing, the temperatures employed range from a little over about 2000° or 2050° up to 3000° C., with the more typical temperatures ranging from about 2400° or 2500° C. to 3000° C. as these temperatures are usually associated with the higher quality grades of graphite. This heating occurs over a rather extensive time period typically of about two weeks. The heating is done in a non-oxidizing atmosphere and by passing electric current directly through the graphite so as to heat the graphite internally and directly by its own electrical resistance, with the graphite itself thus providing the electric resistive heating element, as opposed to the more conventional furnace and heating employed in baking. While graphitizing does not drastically change the density of the carbonaceous materials, it drastically alters and rearranges the internal structure, which, after graphitizing, can no longer be considered amorphous. To the contrary, the resulting graphite structure exhibits the well-known graphitic structural arrangement comprising parallel plates or platelets of flat, hexagonal arrangements of carbon atoms.

To illustrate some of the differences in internal structure in comparing graphite with carbon, the $d_{002}$ and $L_c$ dimensions are useful. The "c" dimension applies to the crystal or crystallite size in the "c" direction, the direction normal to the basal plane, and the $d_{002}$ dimension is the interlayer spacing. These dimensions are normally determined by x-ray diffraction techniques. R. E. Franklin defines amorphous carbon having an interlayer spacing ($d_{002}$) of 3.44 Å and crystalline graphite of 3.35 Å. (Acta *Crystallographica*, Vol. 3, p. 107 (1950); *Proceedings of the Royal Society of London*, Vol. A209, p. 196 (1951); Acta *Crystallographica*, Vol. 4, p. 253 (1951).) During the process of graphitization, the amorphous structure of carbon is changed to the crystalline structure of graphite which is shown by an increase in the $L_c$ dimension and a decrease in the $d_{002}$ dimension. In carbon, the $L_c$ dimension normally ranges from 10 to about 100 Angstrom units (Å) or a little less, whereas most graphite typically exhibits $L_c$ dimension of greater than 350 or 400 Å, that is typically from over 400 Å to about 1000 Å. There is another substantially graphitic structure wherein $L_c$ is between about 100 Å or a little more up to about 350 or 400 Å or a little less, and this is sometimes referred to as "semi-graphite" having the same general plate-like shape and configurations as graphite in its structure but differing some from the normal x-ray diffraction pattern for graphite. Both graphite structures have a $d_{002}$ dimension less than 3.4 Å whereas carbon has a $d_{002}$ dimension greater than 3.4 Å. In general graphitizing at temperatures of about a little over 2000° C. or 2050° C. up to about 2350° or 2400° C. tends to produce the "semi-graphite" structure whereas temperatures over 2400° C. tend to produce the "normal" graphite structure.

Another practice in producing carbonaceous electrodes is to employ particulate graphite as the starting material to which the pitch is added and the mixture compacted, impregnated and baked. However, while this baked carbonaceous material contains graphite it is not constituted of graphite as a continuous unitary graphite structure but rather contains instead both graphite particles and amorphous carbon derived from the pitch. In practicing the invention, it is important that the cathode electrode or electrode member be constituted of a continuous unitary graphite structure by graphitizing after shaping and compacting so as to assure the proper combination of electrical and thermal conductivity, coefficient of expansion and stability properties in the graphite-refractory hard metal composite. This results in the electrode behaving substantially like pure graphite from the standpoint of graphite's desired combination of properties as just mentioned. More importantly, in cathodes of the type shown in the drawings comprising upwardly protruding cathode elements 28 where aluminum is substantially continuously running over a substantially vertical surface, a surface within 20° or 30° of vertical, any non-graphite carbonaceous material on or beneath such a surface can rapidly deteriorate and the cathode member 28 likewise deteriorate rapidly and can even fall apart. Thus in practicing the invention it is quite important that the carbonaceous portion of the upstanding cathode electrode members 28 be constituted of substantially unitary and continuous graphite.

The improved composite cathode-electrode member, specifically referring to the insert 28 in FIGS. 2, 3 and 4, is manufactured as now described. As indicated above, the starting material is some carbonaceous material which may be graphite grade carbon as derived from coal or petroleum coke or it can be particulate graphite. In the case of petroleum coke, such can be calcined at a temperature of about 800° C. to 1600° C. in order to drive off volatile impurities, although this preliminary calcining step can be omitted if desired. In one preferred embodiment or approach to the invention, the coke or carbon in particulate form is blended with the refractory hard metal in particulate form prior to combining with the pitch to provide the green composite. The blending can be done by tumbling the graphite or carbon particles with the refractory hard metal particles. This embodiment, including a blending of carbonaceous and refractory hard metal particles, offers advantages in ease in assuring a good mixture and uniform distribution of the refractory hard metal.

The amount of refractory hard metal used in preparing the original blend should be such as to provide, broadly speaking, a content of 5 to 99% thereof in the electrode member taking into account subsequent altering of carbonaceous or refractory hard metal content by subsequent impregnation treatments. According to one embodiment of the invention, the composite electrode member contains 5 to 50 or 60% refractory hard metal. This embodiment can be useful in the arrangement shown in FIG. 4 wherein the electrode member 28 protrudes or extends from the cathode base 18 toward the anode and into the molten metal pool 19 but not into the electrolyte 30. According to another embodiment the composite electrode member contains from 30 or 40% up to about 99%, preferably 60 or 65% to 98 or 99%, more preferably 80 or 90%, refractory hard metal. This embodiment can be particularly useful in the arrangements shown in FIGS. 1, 2 and 3 where the composite electrode member 28 protrudes or extends from the cathode base 18 toward the anode and through the molten metal 19 and into the electrolyte 30. A preferred practice includes 85 or 90% to 98% refractory hard metal in such an electrode member 28 extending into the electrolyte bath and provides such member without adding a substantial amount of carbonaceous material in the original blend to produce the initial compact as explained further hereinafter.

In addition to mixing refractory hard metal particulate into the initial blend, another approach or embodiment of the invention uses the pitch binder for forming the initial green body as a vehicle to incorporate the refractory hard metal into the compact. Normally in making graphite the initial starting material, that is the coke or carbon, is blended with a pitch binder to provide a mixture having a pitch content of about 10% to 30%, and this is compacted to provide the initial green body. According to this particular embodiment or approach to the invention, refractory hard metal is added to the pitch prior to blending the latter with the carbon.

The green carbonaceous body, which according to the preceding discussed approaches or embodiments of the invention, may already incorporate some amount of refractory hard metal, is next compacted to provide a green body capable of supporting itself. The compacting may mold the green body to essentially its final shape or it may include a working step such as extruding or rolling to reduce its cross-sectional size and produce a distinct orientation of grains in the direction of rolling or extruding wherein grains have a major axis or dimension, for instance, twice the other dimensions with the major axes of the grains oriented somewhat in one direction. At this point, the shaped green body can be cut into sections to provide two or more electrode members. The electrode members are baked at about 700° C. to 1600° C. to drive off volatiles remaining from the pitch binder or even from the initial carbonaceous particulate material if it is not previously calcined. The baked electrode members are then immersed to impregnate them with liquid pitch which increases the density of the baked piece after which the baking is repeated to drive off volatiles. According to one approach or embodiment of the invention, this pitch impregnation step can be employed to incorporate into a carbonaceous body the refractory hard metal. Since the pitch impregnation-bake cycle is often repeated a number of times, such can be employed to progressively enrich the composite with the refractory hard metal. Thus, one embodiment of the invention includes a plurality of such pitch impregnation steps employing a pitch containing a suspended refractory hard metal as applied to a baked green carbonaceous body to simultaneously increase its density and incorporate into the body the refractory hard metal. It is preferred that the pitch for this application be of relatively low viscosity. For the embodiment where the compact is constituted of refractory hard metal and pitch without particulate carbon, the pitch impregnationdensification step can be omitted.

After densification, where employed, the baked electrode material is graphitized at a temperature within a range between a minimum of a little over 2000° C. or 2050° C., preferably 2100° C., up to about 3000° C. One practice is to graphitize between 2050° or 2100° C. and about 2350° or 2400° C. Graphitizing within this temperature range tends to impart a slightly porous graphite structure which can be advantageous where subsequent impregnation or coating operations are contemplated. Graphitizing temperatures ranging between a minimum of 2350° or 2400° C. up to about 3000° C. can be preferred when no subsequent refractory hard metal impregnation operation is performed or when substantially no carbon particulate is used in the initial compact.

Even after graphitizing, the graphite can be impregnated or further impregnated as the case may be, with refractory hard metal. This can be done by suspending the refractory hard metal in a suitable vehicle which can again be pitch or a less viscous vehicle, and this treatment is advantageously augmented by vacuum or pressure. For instance, referring to FIG. 2, the pipe could have its internal diameter plugged at each end and a vacuum pulled therein and the cylinder in FIG. 3 could have its bottom end drilled to accept a pipe fitting through which a vacuum is pulled. This pressure augmentation is advantageously applied for refractory hard metal impregnation after graphitizing, but can also be employed at earlier stages of impregnation as by the impregnation through the use of pitch prior to graphitization.

The practice referred to above wherein substantially no particulate coke or carbon is employed in the initial compact has advantages in simple manufacture and very low wear rate. Hence, this practice wherein substantially no particulate carbon, that is less than 5%, preferably less than 1 or 2%, is added to the initial blending with binder is considered a preferred practice. According to this practice, the initial compact is provided by blending refractory hard metal particulate and pitch, preferably coal tar pitch, the amount of the former being such as to constitute at least 85%, preferably 90 to 98%, of the composite after graphitization, substantially no carbon particulate being added to the pitch. The compact is baked and graphitized without intermediate pitch impregnation and densification steps and the graphitizing is carried out at relatively high temperatures in excess of 2400° C., preferably 2600° C. or more.

Another embodiment of the invention includes applying to the composite electrode members 28 provided in accordance herewith a coating of essentially pure refractory hard metal. A preferred method for such coating is chemical vapor deposition such as by hydrogen reduction of the chlorides of titanium and boron in accordance with the work of T. M. Bessmann and K. E. Spears appearing in the *Journal of the Electrochemical Society*, Volume 124, Issue No. 5 (1977) at page 786, incorporated herein by reference. Such deposition can be effected at a temperature of 800° to 1100° C., for instance 925° C., and heating is preferably effected in a non-oxidizing or inert atmosphere. A suitable mixture of the active gases is about 3 parts $TiCl_4$, 9 parts $BCl_3$ and about 100 parts $H_2$ by volume. The coating may be around 0.015 inch to about 0.05 inch thick, with 0.015 to 0.025 inch being suitable for most operations, and should include from 0.010 to 0.025 inch or more of dense columnar grain structure or pattern. While chemical vapor deposition is preferred as a coating method, other methods such as plasma spraying and electrochemical or slurry deposition are also believed to be possibly useful. Refractory hard metal coatings are preferably applied after graphitizing.

The embodiment of the invention shown in FIG. 5 includes providing a first carbonaceous body which may be a graphite body or essentially carbonaceous body and using such as a core 48 about which is added a carbonaceous layer 49 impregnated with refractory hard metal as provided herein. This can provide some economy in conserving the use of the refractory hard metal. This can be provided by forming a green compact of coke and pitch binder for core 48 and forming around the core 48 the outer layer 49 comprising a blend including the refractory hard metal, carbon and pitch and then baking and graphitizing such layered composite. The outer layer 49 can be constituted from the preferred mixture containing at least 85 or 90% refractory hard metal and over this can be placed an essentially pure refractory hard metal coating such as chemical vapor deposited $TiB_2$ as just described.

Hence there are various embodiments of the invention which are suitable in a wide variety of conditions depending upon the desired low wear rate and economic considerations. One preferred practice of the invention includes applying to the improved composite cathode surface a coating of aluminum prior to its use as a cathode surface in electrolysis. The coating can be applied by flame or other spraying, electrolytically, dipping in molten aluminum or any other manner of applying a metallic aluminum coating. Similarly, the coating can be applied as an aluminum compound convertible to aluminum, for instance, in heating up a cell preliminary to its start-up. Another preferred practice is to provide an inverted aluminum or steel can over the upstanding portion of the cathode surface for start-up. Either practice tends to reduce air burning of the graphite phase of the protruding electrode members 28 during start-up of cell operation. The coating or can is consumed by the start-up operation to leave the improved cathode surface regions in contact with the contents of the cell.

A further variant of the invention concerns providing a sintered refractory hard metal electrode member which is much less sensitive to thermal shock than conventionally sintered refractory hard metal members which often break up during start-up of an electrolytic cell for producing aluminum. According to this variant a mixture containing about 90% to 99½%, preferably from over 95% to about 98% or 99%, refractory hard metal such as titanium diboride particulate and particulate carbonaceous material is blended such as by tumbling in a ball mill which serves to both grind and mix the carbonaceous and titanium diboride particles. This mixture is compacted at about 20 to 40 ksi, preferably around 30 ksi, and sintered at temperatures of between about 1500° and 2100° C., preferably 1650° to 2000° C., in a non-oxidizing atmosphere for a sufficient time for the titanium diboride to undergo the grain growth effects associated with sintering so as to achieve an integral sintered structure. A time of ½ hour to 5 hours, preferably ¾ to 1½ hours, is suitable. It has been found that the relatively small amount of carbonaceous material acts as an oxide and oxygen scavenger and removes the oxides inherently and almost unavoidably present in commercially available titanium diboride. These oxides tend to be dissolved in an electrolytic cell for producing aluminum, especially a fluoroaluminate cell, and this can seriously degrade a titanium diboride sintered electrode member. Hence, this variant of the improvement provides for achieving an improved sintered titanium diboride or other refractory hard metal electrode or cathode member highly useful in electrolytic cells for producing aluminum.

EXAMPLE

Graphite electrodes of the shape shown in FIG. 3 were made by mixing petroleum coke particles with a pitch binder and compacting this mixture to provide a green compact which was baked to drive off the volatiles from the pitch and provide initial compacts which were densified by a plurality of pitch impregnation-baking steps. The densified compacts were then graphitized at a temperature of about 2800° C. Cylindrical electrode protrusion shapes shown in FIG. 3 were then machined from this graphite. One set of such electrodes was pure graphite (Example 1), whereas other groups of the electrodes had incorporated therein 5% $TiB_2$ and 10% $TiB_2$ (Examples 2 and 3) which incorporation was effected by blending the dry $TiB_2$ particles with the petroleum coke particles prior to the initial blending with pitch preparatory to formation of the initial green compact. The electrodes so produced were subjected to electrode wear testing during electrolysis in a bench scale Hall type cell of the general arrangement depicted in FIGS. 1 and 3 with the electrode members 28 protruding above the molten aluminum bath 19. The electrolyte contained 95% $Na_3AlF_6$ (NaF/$AlF_3$=1.1), 5% $CaF_2$ with Al$_2$O$_3$ fed continuously and the distance between the anode and the cathode protrusion members 28 was ½ inch. The test was run for 100 hours during which aluminum product was drained daily. The percent loss of length of the electrode during this period, along with the percent loss in diameter at the highest point exposed in the bath electrolyte, was measured as an indication of the wear rate and the results are tabulated below in Table 1 as Examples 1, 2 and 3.

TABLE 1

| Example | TiB$_2$ Content | Electrode Loss | |
|---|---|---|---|
| | | Length | Diameter |
| 1 | 0% | 3.2% | 13.8% |
| 2 | 5% | 1.3% | 11.9% |
| 3 | 10% | 0.18% | 4.4% |

It can be seen from the above-mentioned examples that incorporation of refractory hard metals in accordance with the invention improves the performance of graphite electrodes by a substantial margin.

In another example, Example 4, electrodes of like shape but larger were produced in the same manner as Examples 2 and 3 but included 30% TiB$_2$ in the composite. These electrodes were tested for 30 days in a somewhat larger pilot size Hall type cell also of the general arrangement shown in FIGS. 1 and 3 and the results of this test are reported in Table 2. In yet another example, Example 5, a composite electrode was made by blending a large amount of TiB$_2$ particles in a coal tar pitch binder without any carbonaceous or coke particulate being added. This mixture was compacted to provide a green compact which was baked to drive off volatiles after which the compact was graphitized at above 2400° C. The graphitized composite contained approximately 96% TiB$_2$ and 4% graphite. This was made into electrode protrusion cylinders and tested as in Example 4 and the results for Example 5 are reported in Table 2.

TABLE 2

| Example | TiB$_2$ Content | Electrode Loss | |
|---|---|---|---|
| | | Length | Diameter |
| 4 | 30% | <0.1% | 20% |
| 5 | 96% | <0.1% | <0.1% |
| 6 | 0% | 50% | 100% |

In Table 2 it becomes readily apparent that in this more severe test the advantages of the invention are still retained which is graphically demonstrated by Example 6 where a pure graphite comparison sample was completely consumed with respect to the portion extending into the electrolyte bath 30 in FIG. 1. The preferred embodiment fashioned from a high TiB$_2$ content and pitch binder without addition of carbonaceous particulate, Example 5, demonstrated outstanding performance. Not only does this highly commend its use in Hall type cells to conserve power at a substantial materials and manufacturing cost savings comparable to pure TiB$_2$ electrodes, such improved electrodes have demonstrated a marked decrease to thermal shock compared to pure TiB$_2$ electrode protrusions. This is an invaluable benefit in starting up a cell during which pure TiB$_2$ electrode members often show a propensity to crack.

While the invention has been described with particular reference to producing aluminum, it is believed suitable for producing other metals by electrolysis of electrolyte baths containing compounds thereof.

While the invention has been described in terms of preferred embodiments, the claims appended hereto are intended to encompass all embodiments which fall within the spirit of the invention.

What is claimed is:

1. A method for the production of metal in an electrolytic cell comprising electrolyzing a bath comprising a compound of the metal dissolved in a molten solvent by passing electric current between one or more anode and one or more cathode surfaces to produce said metal which collects as a molten pool upon a base cathode surface, wherein the improvement comprises providing one or more cathode surfaces extending outwardly from said base cathode surface toward each anode, said cathode surfaces being provided as composite surface regions comprising graphite impregnated with refractory hard metal and by providing a composite mixture comprising carbonaceous binder and refractory hard metal and graphitizing said composite mixture at a temperature of at least 2350° C. in a non-oxidizing atmosphere to convert carbonaceous material therein to the graphitic structure and produce a unitary continuous graphite structure impregnated with refractory hard metal at said cathode surface region.

2. The method according to claim 1 wherein said metal produced is aluminum.

3. The method according to claim 1 wherein said composite cathode surface region extends through said molten metal pool and into said bath.

4. The method according to claim 3 wherein said composite cathode surface includes a hollow portion adapted for holding an additional pool of molten metal.

5. The method according to claim 3 wherein a plurality of such cathode surface regions extends from said molten metal pool toward each anode surface.

6. The method according to claim 1 wherein said composite cathode surface region extends into said molten metal pool upon the base cathode and the electrolyte bath, but not extending into said bath.

7. The method according to claim 6 wherein a plurality of such cathode surface regions extends from said molten metal pool toward each anode surface.

8. The method according to claim 1 wherein said composite surface region is provided as an outward layer over a substantially carbonaceous core.

9. The method according to claim 1 wherein said electrolytic cell is a Hall type cell and said cell bath is a fluoroaluminate type and wherein alumina is electrolytically reduced to produce aluminum which collects as a molten pool upon said base cathode, and wherein a plurality of said composite cathode surface regions corresponds to each anode surface, said composite cathode surface regions extending outwardly from said cathode base toward said anode surface and into said molten aluminum pool.

10. The method according to claim 9 wherein said composite cathode surface region contains 5 to 60% refractory hard metal.

11. The method according to claim 1 wherein said electrolytic cell is a Hall type cell and said cell bath is a fluoroaluminate type and wherein alumina is electrolytically reduced to produce aluminum which collects as a molten pool upon said base cathode, and wherein the electric current is passed through said bath from one or more anodes to a plurality of said composite cathode surface regions corresponding to each anode surface, said composite cathode surface regions extending outwardly from said base cathode toward said anode surface and through said molten aluminum pool and into said cell bath.

12. The method according to claim 4 wherein said composite cathode surface region contains 60% to 99% refractory hard metal.

13. The method according to claim 4 wherein said composite cathode surface region contains 90 to 98% refractory hard metal and is produced by graphitizing a mixture comprising said refractory hard metal in particulate form and a carbonaceous binder without adding carbonaceous particulate thereto.

14. The method according to claim 13 wherein said graphitizing is carried out at over 2400° C.

15. The method according to claim 1 wherein said refractory hard metal is selected from the carbides, silicides and nitrides of the fourth, fifth and sixth groups of the Periodic Table.

16. The method according to claim 1 wherein said refractory hard metal is selected from the borides of titanium and zirconium.

17. The method according to claim 1 wherein said refractory hard metal in said composite mixture comprises $TiB_2$ provided in particulate form passing through a 325 mesh screen.

18. The method according to claim 1 wherein said graphitization is effected at temperatures of over 2400° C. and the graphite structure so produced exhibits an $L_c$ dimension greater than 400 Å and a $d_{002}$ dimension less than 3.4 Å.

19. The method according to claim 1 wherein said cathode surface is coated with metallic aluminum or an aluminum compound convertible to aluminum before used as an electrode in said electrolytic cell.

20. The method according to claim 1 wherein said composite surface region includes a coating consisting substantially of refractory hard metal.

21. The method according to claim 1 wherein prior to said graphitizing said composite is baked and then impregnated with pitch and again baked to increase its density.

22. The method according to claim 21 wherein said pitch contains refractory hard metal and impregnates such into said composite.

23. The method according to claim 1 wherein said electrolytic cell electrolyzes a chloroaluminate electrolyte to produce aluminum.

24. The method according to claim 1 wherein said composite mixture contains added particulate carbonaceous material.

25. A method for the production of aluminum in an electrolytic cell comprising electrolyzing a molten fluoroaluminate salt bath containing aluminum oxide dissolved therein by passing electric current between one or more anodic and one or more cathodic surfaces to electrolyze said bath therebetween to produce molten aluminum which collects beneath said salt bath as a molten pool, wherein the improvement comprises providing one or more cathodic surfaces protruding from a base cathode beneath said molten aluminum pool and into said molten aluminum pool, the surface regions of said protruding cathode surfaces being provided as a composite comprising graphite impregnated with a refractory hard metal selected from the group consisting of the borides of titanium and zirconium, and provided by providing a composite mixture containing said refractory hard metal in particulate form and a carbonaceous binder to form a compact, baking to drive off volatiles from said compact without changing its internal structure and thereafter graphitizing said composite to convert carbonaceous material therein into graphite, said graphitization being carried out at temperatures over 2350° C. in a non-oxidizing atmosphere to produce at said cathode surface regions a substantially unitary continuous graphite structure impregnated with refractory hard metal.

26. The method according to claim 25 wherein said protruding cathode surfaces terminate within said molten aluminum pool.

27. The method according to claim 26 wherein said improved cathode surface regions contain 5 to 60% refractory hard metal and wherein said composite mixture provided contains added carbonaceous particulate.

28. The method according to claim 25 wherein said protruding cathode surfaces extend through said molten aluminum pool and into the overlying salt bath.

29. The method according to claim 28 wherein said improved cathode surface regions contain 60 to 99% refractory hard metal.

30. The method according to claim 28 wherein said composite cathode surface region contains 90 to 98% refractory hard metal and said graphitizing is carried out over 2400° C.

31. The method according to claim 30 wherein said composite surface region includes a coating consisting substantially of refractory hard metal.

32. The method according to claim 28 wherein said composite surface region includes a coating consisting substantially of refractory hard metal.

33. The method according to claim 28 wherein said graphitizing is carried out at over 2400° C.

34. The method according to claim 25 wherein said composite cathode surface includes a hollow portion adapted for holding an additional pool of molten metal.

35. The method according to claim 25 wherein said provided composite mixture includes added particulate carbonaceous material.

36. The method according to claim 35 wherein prior to said graphitizing said composite is baked and then impregnated with pitch to densify said graphite.

37. The method according to claim 36 wherein prior to said graphitizing said composite is baked and then impregnated with pitch and again baked to increase its density and wherein said pitch contains refractory hard metal and impregnates such into said composite.

38. The method according to claim 25 wherein said improved cathode surface region prior to use in said cell is coated with aluminum or an aluminum compound which provides such coating when starting up said cell.

* * * * *

UNITED STATES PATENT AND TRADEMARK OFFICE
CERTIFICATE OF CORRECTION

PATENT NO. : 4,308,114

DATED : December 29, 1981

INVENTOR(S) : Subodh K. Das et al.

It is certified that error appears in the above-identified patent and that said Letters Patent is hereby corrected as shown below:

Column 7, line 43, after "90%" insert -- to 98% --.

Column 8, line 37, "impregnationdensification" should read -- impregnation-densification --.

Column 13, line 5, "claim 4" should read -- claim 11 --.

Column 13, line 8, "claim 4" should read -- claim 11 --.

Column 13, line 35, after "before" insert -- being --.

Signed and Sealed this

Eighth Day of November 1983

[SEAL]

Attest:

Attesting Officer

GERALD J. MOSSINGHOFF

Commissioner of Patents and Trademarks